March 27, 1934.  C. ROUX ET AL  1,952,286
SELF RELEASING CLUTCH
Filed Feb. 4, 1932  3 Sheets-Sheet 1

INVENTORS:
Charles Roux
and Louis Eugène Clémencet
ATTORNEY

March 27, 1934.    C. ROUX ET AL    1,952,286
SELF RELEASING CLUTCH
Filed Feb. 4, 1932    3 Sheets-Sheet 3

INVENTORS:
Charles Roux
and Louis Eugène Clémencet
ATTORNEY

Patented Mar. 27, 1934

1,952,286

UNITED STATES PATENT OFFICE 1,952,286

SELF-RELEASING CLUTCH

Charles Roux and Louis Eugène Clémencet, Paris, France

Application February 4, 1932, Serial No. 590,922
In France February 11, 1931

10 Claims. (Cl. 74—7)

The object of this invention is to provide improvements in or relating to the self-releasing clutch which is the subject matter of the application for a U. S. Patent filed on the 13th day of October 1930 under Serial Number 488,524.

Taking the same reference numerals as those used in the said application, the present improvements concern:

1st. The method for securing the springs 8 and 12 described in and by the said patent to the motion ring 7 on the one hand and to the pinion 6 on the other hand, said improvements being illustrated, by way of example, in Figures 1, 2, 3, 4, 5, 6 and 7 of the drawings appended hereto.

2nd. The method of securing the ring 38 on the pinion 6, this improvement being illustrated, as an example, by Figure 8.

3rd. A device adapted to render more positive the abutment of the free end of the springs 8 and 12 when the pinion 6 returns to its releasing position and to prevent the free end 14 of the spring or springs 12 secured to the pinion 6 from jamming between spring or springs 8 and motion ring 7 and also to prevent the free end 10 of spring or springs 8 secured to the motion ring 7 from jamming between spring or springs 12 and pinion 6; this improvement is illustrated, as an example, by Figures 9 and 10 of the drawings appended hereto.

In said drawings

Figure 1:
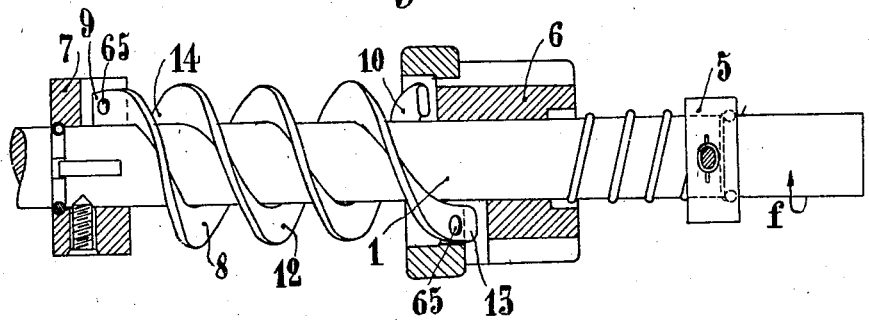
Figure 1 is a view, partly in elevation, partly in longitudinal section, showing the securing device of springs 8 and 12, the contrivance being mounted on the drive shaft.
Figure 2:
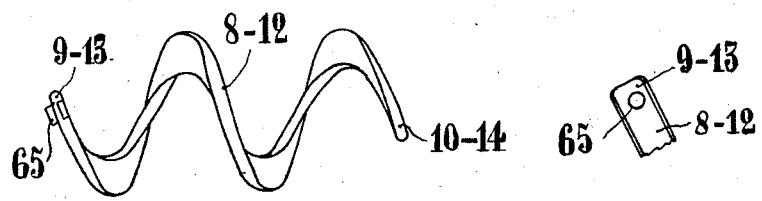
Figure 2 is an elevation illustrating an embodiment of springs 8 and 12.
Figure 3:
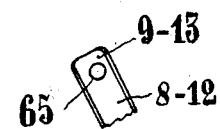

Figure 3 is a part of an end view of the hooking end 9 and 13 of the springs 8 and 12.

Figure 4:
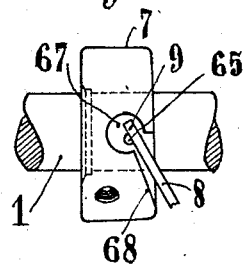

Figure 4 is an elevation of the motion ring 7 showing the device for hooking spring or springs 8 to said motion ring.

Figure 5:
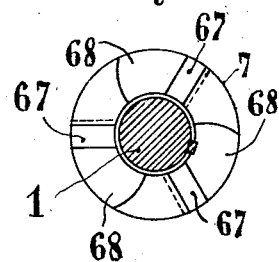

Figure 5 is a front view of the motion ring 7.

Figure 6:
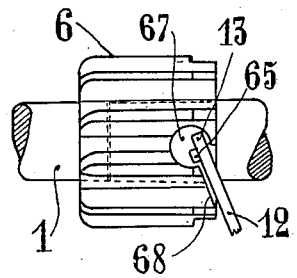

Figure 6 is an elevation of the pinion 6 showing the hooking device of spring or springs 12.

Figure 7:
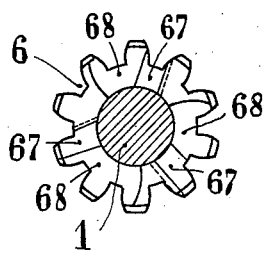

Figure 7 is a front view of pinion 6, the spring or springs 12 being removed.

Figure 8:
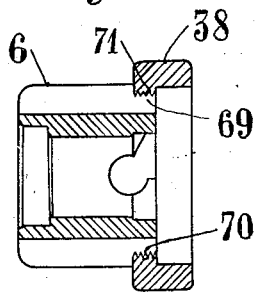

Figure 8 is a longitudinal section of a ready mounted set formed of the pinion 6 and the hooped ring 38.

Figure 9:
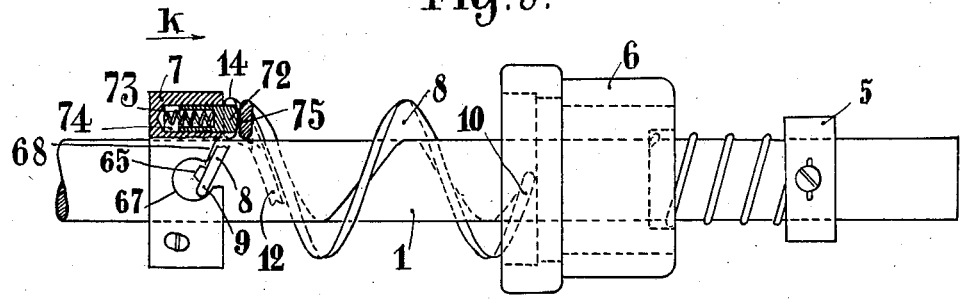

Figure 9 is a view, partly in elevation, partly in longitudinal section, showing the spring 8 cut away opposite the plunger tappet 72 and then continued up to the end thereof 9 secured to the motion ring 7.

Figure 10:
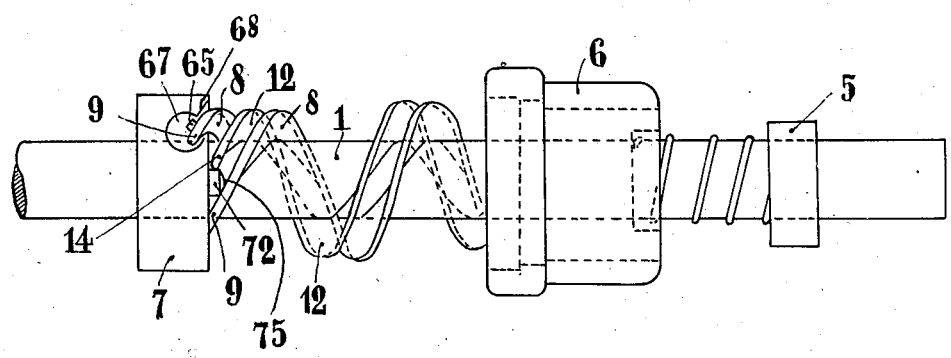

Figure 10 is a plan view showing the hooking end 9 of a second spring 8.

Figures 1, 2, 3, 4, 5, 6 and 7 illustrate, by way of example, a device for securing spring or springs 8 to the motion ring 7 and for securing spring or springs 12 to the pinion 6.

The end 9 of the spring or of each of the springs 8 is inserted into a recess 67 provided in the motion ring 7, the end 13 of the spring or of each of the springs 12 being also inserted into a similar recess 67 provided in pinion 6, each of said recesses being formed with a clearance along a guide surface 68 which may be either a sloping or helicoidal one.

The other end 10 of the spring or of each of the springs 8 and also the other end 14 of the spring or of each of the springs 12 remains free as is set forth in the aforementioned application.

The end 9 of the spring or of each of the springs 8 and the end 13 of the spring or of each of the springs 12 has a protruding portion or boss 65 formed of a part swaged into those springs or obtained by any other means such as cambering, folding or setting up of the end of said springs, so that the said protruding portion 65 of each of the springs 8 and 12 will come to be located in its corresponding recess 67 in the motion ring 7 and in the pinion 6, as illustrated by Figures 4 and 6.

Once in position on shaft 1, the springs 8 and 12 are held by their boss 65 projecting into recess 67 and they are then unable to become disengaged from their recesses unless the element containing the recesses and the springs are removed from the shaft. As will be apparent, therefore, the securing of spring or springs 8 in the motion ring 7 and of spring or springs 12 to the pinion 6 is ensured, regardless of the direction of rotation of the device.

Obviously, for the rotary direction contrary to the one indicated by the arrow f (Figure 1) or for a coiling direction of the springs 8 and 12 contrary to the one shown on Figures 1, 2, 3, 4 and 6, the recess 67 and the sloping or helicoidal guide surfaces 68 can also be arranged in the direction opposite the one shown.

The foregoing securing arrangement permits of springs 8 and 12 being readily hooked to motion ring 7 and pinion 6 respectively, since, as a matter of fact, shaft 1 having been removed, the end 9 of springs 8 and the end 13 of springs 12 have but to be introduced into their respective recesses 67 when said shaft 1 is again placed in position said springs 8 and 12 can no more get released.

One of the advantages of the device, besides readily mounting and taking down of the springs, consists in the fact that the said springs are operative along their whole length inclusive of the hooking end.

As illustrated for example's sake by Figures 5 and 7, three recesses 67 for securing three springs 8 are provided in the motion ring 7 and three similar recesses 67 are also provided in the pinion 6 for securing three springs 12.

We wish it to be clearly understood that the springs and consequently the notches or recesses both in the motion ring 7 and in the pinion 6 can be provided in any number.

Figure 8 illustrates a method for mounting the hooped ring 38 on pinion 6. The hooped ring 38 is slid over a portion 69 of the pinion 6, which portion 69 being provided with one or more grooves 70.

The ring 38 is crimped by forcing on the portion 69 of the pinion 6 and the portion 71 of the ring 38 is made by forcing back the material to penetrate into the groove or grooves 70, said ring 38 being thus firmly secured on pinion 6.

The same method as above described may be adopted to crimp a ring onto the motion ring 7.

The improvement illustrated on Figures 9 and 10 essentially consists of a plunger tappet 72 adapted to slide in a recess 74 provided in the motion ring 7; said plunger tappet 72 is stopped in the direction indicated by the arrow k by the spring 8 secured to the motion ring 7 and against which the head of the plunger tappet comes to bear under the action of spring 73. This plunger tappet 72 is thus unable to become released from its housing 74 until the springs 8 are removed from the recesses 67.

These plunger tappets serve to avoid wedging of the free ends of the springs and also to oppose the slight floating or vibration of the springs which may produce noise while the device is out of operation.

The head 75 of the plunger tappet 72, therefore, constantly bears against spring 8, whatever the variations of said spring 8 may be as to pitch and as to slant, especially during compression and release thereof and whatever the rotary direction of the device may be.

When the pinion 6 returns to its releasing position (Figures 9 and 10), the free end 14 of the spring 12 which is secured to said pinion 6 abuts against and is stopped by the plunger tappet 72 (Figure 10).

Thus, as will be apparent, this plunger tappet 72 prevents the free end 14 of spring 12 from jamming between the spring 8 and the motion ring 7, which jamming might interfere with the operation of the device when the clutch is being thrown into gear. When the device comprises a plurality of springs 12, the motion ring 7 may, of course, be provided with as many plunger tappets 72 as there are springs 12, that is to say, for instance and preferably, with a plunger tappet for each spring 12.

As will be readily realized, however, a single plunger tappet 72 is able to prevent the free end 14 of all springs 12 from jamming between springs 8 and the motion ring 7.

As a matter of fact, the plunger tappet 72 which prevents the free end 14 of one of the springs 12 from jamming as hereinabove set forth ensures the same result for the similar end 14 of the other springs 12.

The pinion 6 may also be provided with one or more plunger tappets 72 like the foregoing one, the head 75 of this plunger tappet or of these plunger tappets constantly bearing against the spring or springs 12 secured to said pinion so as to ensure a more positive stop and to prevent the free end 10 of the spring or springs 8 secured to the motion ring 7 from jamming between spring or springs 12 and said pinion 6.

As has been hereinbefore stated concerning the motion ring 7, if the device comprises a plurality of springs 8 the pinion 6 may, of course, be provided with a plurality of plunger tappets or with as many of these as there are springs 8, that is to say, for instance and preferably, with one plunger tappet for each spring 8.

The same plunger tappet arrangement as above can, of course, be used whatever the coiling direction of the springs 8 and 12 and whatever the rotary direction of the device may be.

Figure 9 shows, as an example, an embodiment in which the plunger tappet 72 is formed of a hollow cap adapted to permit of housing a spring 73 of greater length and therefore conditioned for better operation in the recess 74.

We wish it to be understood, however, that the cap 72 may be replaced by a solid tappet or by any spring actuated dog or spur or by any other equivalent part or device.

We claim:

1. A self releasing clutch comprising a driving shaft, a driven pinion mounted for sliding along and revolving around said shaft, a motion ring fixed on the shaft, a series of coil springs one end of each of which is secured to the pinion, a series of coil springs one end of each of which is secured to the motion ring, said springs being secured to the motion ring and pinion by means of a boss provided on one of the ends of each of said springs and housed in a recess provided in the motion ring on the one hand and in the pinion on the other hand.

2. A self releasing clutch comprising a driving shaft, a driven pinion mounted for sliding along and revolving round said shaft, a motion ring fixed to the shaft, a series of coil springs one end of each of which is secured to the pinion, a series of coil springs one end of which is secured to the motion ring and a device for securing said springs by means of a boss provided on one of the ends of each of those springs and housed in a recess fitted with a helicoidal sloping guide surfaced clearance provided in the motion ring on the one hand and in the pinion on the other hand.

3. A self releasing clutch comprising a control or driving shaft, a driven pinion mounted for sliding along and revolving round said shaft, a motion ring integral with the shaft, a series of coil springs one end of each of which is secured to the pinion, a series of coil springs one end of each of which is secured to the motion ring, and a device forming a positive thrust block adapted to prevent jamming of the free end of the springs of the pinion on the one hand and of the motion ring on the other hand, said device being formed of a number of plunger tappets housed in the motion ring and in the pinion and held each in permanent contact with the driving springs by springs housed in the motion ring and in the pinion.

4. A self releasing clutch comprising a control or driving shaft, a driven pinion mounted for sliding along and revolving round said shaft, a motion ring integral with the shaft, a series of coil springs one end of each of which is secured to the pinion, a series of coil springs one end of each of which is secured to the motion ring and a device forming a positive thrust block adapted to prevent jamming of the free end of the springs of the pinion on the one hand and of the motion ring of the other hand, said device being formed of a number of hollow cap-shaped plunger tappets housed in the motion ring and in the pinion and held each in permanent contact with the driving springs by springs housed in the motion ring and in the pinion.

5. A self-releasing clutch comprising a driving shaft, a driven pinion mounted for sliding along and revolving around said shaft, a motion ring fixed on the shaft, a series of coil springs one end of each of which is secured to the pinion, a series of coil springs one end of each of which is secured to the motion ring, the springs being secured to the pinion by means of a boss on the end of each spring seated in a recess in the pinion, the end of the pinion facing toward the springs being provided with helical sloping seats adapted to engage portions of the end convolutions of the springs.

6. A self-releasing clutch comprising a driving shaft, a driven pinion mounted for sliding along and revolving around said shaft, a motion ring fixed on the shaft, a series of coil springs one end of each of which is secured to the pinion, a series of coil springs one end of each of which is secured to the motion ring, the springs being secured to the motion ring by means of a boss on the end of each spring seated in a recess in the motion ring, the end of the motion ring facing toward the springs being provided with helical sloping seats adapted to engage portions of the end convolutions of the springs.

7. A self-releasing clutch comprising a driving shaft, a driven pinion mounted for sliding along and revolving around said shaft, a motion ring fixed on the shaft, a series of coil springs one end of each of which is secured to the pinion, a series of coil springs one end of each of which is secured to the motion ring, the springs being secured to the pinion by means of a boss on the end of each spring seated in a recess in the pinion, the end of the pinion facing toward the springs being provided with helical sloping seats adapted to engage portions of the end convolutions of the springs, and tappet plungers for the springs mounted on the face of the pinion which receives the ends of the springs.

8. A self-releasing clutch comprising a driving shaft, a driven pinion mounted for sliding along and revolving around said shaft, a motion ring fixed on the shaft, a series of coil springs one end of each of which is secured to the pinion, a series of coil springs one end of each of which is secured to the motion ring, the springs being secured to the motion ring by means of a boss on the end of each spring seated in a recess in the motion ring, the end of the motion ring facing toward the springs being provided with helical sloping seats adapted to engage portions of the end convolutions of the springs, and tappet plungers for the springs mounted on the face of the motion ring which receives the ends of the springs.

9. A device for transforming rotary into longitudinal movement comprising a rotary driving element, a reciprocable driven element, each of said elements having a plurality of circumferentially-spaced keyhole recesses formed therein, and a plurality of coaxial helical springs carried by each of said elements, each spring having one end provided with an enlargement positioned in one of said recesses of one of the elements for anchoring the springs to the elements, the free ends of the springs of one element being coiled together alternately with the ends of the springs of the other element.

10. A mechanical movement for transforming rotary movement into longitudinal and rotary movement comprising a driving shaft, a rotary driving element fixed to the shaft, a driven element slidably and rotatably mounted on the shaft, means for limiting movement of the driven element axially of the shaft, each of said elements having a plurality of circumferentially-spaced keyhole recesses formed therein, and a plurality of coaxial helical springs carried by each of said elements, each spring having one end provided with an enlargement positioned in one of said recesses of one of the elements for anchoring the springs to the elements, the free ends of the springs of one element being coiled together alternately with the ends of the springs of the other element, the helical springs being of such length as to frictionally engage each other when the driven element has moved to its limit of axial movement to frictionally transmit rotary motion from the driving element to cause the driven member to rotate.

CHARLES ROUX.
LOUIS EUGÈNE CLÉMENCET.